(12) United States Patent
Cable et al.

(10) Patent No.: US 8,697,313 B2
(45) Date of Patent: Apr. 15, 2014

(54) METHOD FOR MAKING A FUEL CELL FROM A SOLID OXIDE MONOLITHIC FRAMEWORK

(75) Inventors: Thomas L. Cable, Newbury, OH (US); Stephen W Sofie, Bozeman, MT (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/860,210

(22) Filed: Aug. 20, 2010

(65) Prior Publication Data

US 2011/0045386 A1 Feb. 24, 2011

Related U.S. Application Data

(62) Division of application No. 11/228,184, filed on Sep. 16, 2005.

(51) Int. Cl.
*H01M 8/00* (2006.01)
*H01M 8/10* (2006.01)
*H01M 4/48* (2010.01)

(52) U.S. Cl.
USPC ............................ 429/535; 429/486; 429/489

(58) Field of Classification Search
USPC .................................................. 429/486, 489
See application file for complete search history.

(56) References Cited

U.S. PATENT DOCUMENTS

| | | | | |
|---|---|---|---|---|
| 3,226,263 | A | * | 12/1965 | Oswin ................................ 419/2 |
| 3,974,108 | A | * | 8/1976 | Staut et al. .................. 252/519.1 |
| 4,476,198 | A | * | 10/1984 | Ackerman et al. ............. 429/456 |
| 5,106,654 | A | * | 4/1992 | Isenberg ....................... 427/115 |

(Continued)

OTHER PUBLICATIONS

Moon et al., Preparation of NiO-YSZ tubular support with radially aligned pore channels; Materials Letters 57 (1428-1434), 2003.*

(Continued)

*Primary Examiner* — Barbara Gilliam
*Assistant Examiner* — Steven Scully
(74) *Attorney, Agent, or Firm* — Robert H. Earp, III

(57) ABSTRACT

The invention is a novel solid oxide fuel cell (SOFC) stack comprising individual bi-electrode supported fuel cells in which a thin electrolyte is supported between electrodes of essentially equal thickness. Individual cell units are made from graded pore ceramic tape that has been created by the freeze cast method followed by freeze drying. Each piece of graded pore tape later becomes a graded pore electrode scaffold that subsequent to sintering, is made into either an anode or a cathode by means of appropriate solution and thermal treatment means. Each cell unit is assembled by depositing of a thin coating of ion conducting ceramic material upon the side of each of two pieces of tape surface having the smallest pore openings, and then mating the coated surfaces to create an unsintered electrode scaffold pair sandwiching an electrolyte layer. The opposing major outer exposed surfaces of each cell unit is given a thin coating of electrically conductive ceramic, and multiple cell units are stacked, or built up by stacking of individual cell layers, to create an unsintered fuel cell stack. Ceramic or glass edge seals are installed to create flow channels for fuel and air. The cell stack with edge sealants is then sintered into a ceramic monolithic framework. Said solution and thermal treatments means convert the electrode scaffolds into anodes and cathodes. The thin layers of electrically conductive ceramic become the interconnects in the assembled stack.

21 Claims, 5 Drawing Sheets

(56) References Cited

U.S. PATENT DOCUMENTS 5,368,951 A * 11/1994 Shiratori et al. .............. 429/465
5,441,822 A * 8/1995 Yamashita et al. ............ 429/508
6,017,647 A * 1/2000 Wallin .......................... 429/482
6,511,768 B1 * 1/2003 Trapp et al. ................... 429/437

OTHER PUBLICATIONS

Article by Moon, et al. Materials Letters 57 (2003) 1428-1434. www.sciencedirect.com.

* cited by examiner

METHOD FOR MAKING A FUEL CELL FROM A SOLID OXIDE MONOLITHIC FRAMEWORK

CROSS-REFERENCE TO RELATED APPLICATIONS

This application is a divisional of U.S. patent application Ser. No. 11/228,184, entitled MONOLITHIC SOLID OXIDE FUEL CELL STACK WITH SYMMETRICAL, BI-ELECTRODE SUPPORTED CELLS by the same inventors and having a filing date of Sep. 16, 2005.

STATEMENT REGARDING FEDERALLY SPONSORED RESEARCH OR DEVELOPMENT

The invention described herein was made by an employee of the United States Government and may be manufactured and used by or for the Government for Government purposes without the payment of any royalties thereon or therefore.

FIELD OF THE INVENTION

The present invention relates generally to fuel cells and fuel cell stacks, and more particularly to high power density solid-oxide fuel cells and the fabrication of unitized stacks of solid oxide fuel cells created from monolithic ceramic frameworks having bi-electrode supporting structure and thin, electrically conductive, non-metallic interconnects between the individual cell repeat units.

BACKGROUND

A majority of solid oxide fuel cell developers are pursuing a planar cell geometry with an anode supported cell design (ASC) and metal interconnects. The major challenges of the ASC technology are: cell fabrication and operational reliability; cell electrical contact to the interconnect; and sealing of the cell-to-metal interconnect. The thin electrolyte, normally 10-15 microns thick, is supported on a relatively thick anode made of nickel oxide and yttria stabilized zirconia (NiO-YSZ), which is a cermet having a thickness on the order of 700 to 1,000 microns.

The anode/electrolyte bi-layer is sintered first, followed by application of a thin cathode, usually 25-50 microns thick, which is fired at a lower temperature than the ASC to create a complete, ASC, solid oxide fuel cell (SOFC). Such cells are arrayed in stacks wherein the individual cells are in series electrical contact with one another by means of metal interconnects.

The difficulties in ASC cell and stack fabrication and operation include: 1) shrinkage matching of the thick NiO-YSZ cermet anode and the thin YSZ electrolyte layers during the sintering process; 2) production of flat cell parts for assembly into fuel cell stacks; 3) as the nickel component of the anode cermet is reduced from NiO to Ni metal, the resultant volume change can generate stresses within the anode, sometimes leading to failure of the thin YSZ electrolyte; 4) the anode is sensitive to leaks of oxygen that can cause oxidation of the Ni metal resulting in a sudden expansion of the anode and failure of the cell; 5) provision of sufficient anode thickness to support the electrolyte can lead to diffusion problems in the anode making it hard to achieve high fuel utilization required for high-power commercial applications; 6) ASC cells are fragile and can not tolerate high the compressive loading that is required for some of the compression type seals used with the ASC stacking technology; 7) pore channels of the bulk anode must be relatively narrow in order to give the anode adequate strength, but this limits the rate of gas diffusion into the interior of the thick anode and limits fuel utilization; and 8) the grooved metal interconnects are on the order of 2-3 mm thick and contribute more than 70% of the mass of a stack.

The most critical technical challenges facing all planar SOFC stack developers are the difficulties in providing adequate electrical contact between each cell and its metal interconnect and gas-tight seals. For example, a typical anode supported cell, 7 cm in diameter operating at 750° C. has a power density of 0.9 W/cm$^2$; if that same cell is now placed between two metal interconnects, the performance now drops to 0.6 W/cm$^2$, a full 33% loss of the power, due simply to electrical contact resistance. Electrical contact resistance, gas sealing, and ease of fabrication are at the center of the new SOFC design.

SUMMARY OF THE INVENTION

The present invention is a monolithic solid oxide fuel cell stack comprising two or more symmetrical, bi-electrode supported fuel cell repeat units, each of which includes a first porous electrode scaffold, a second porous electrode scaffold, a thin electrolyte layer disposed between the first and the second porous electrode scaffolds, a thin coating of electrically conductive ceramic deposited upon opposing major outer surfaces of the first and second electrode scaffolds, and a first set of nonconductive edge sealants disposed upon each of two opposing edges of the first electrode scaffolds of each symmetrical, bi-electrode supported fuel cell repeat unit, and a second set of nonconductive edge sealants disposed upon each of two opposing edges of the second electrode scaffolds of each symmetrical, bi-electrode supported fuel cell repeat unit. The first porous electrode scaffold and the second porous electrode scaffold of each of the two or more symmetrical, bi-electrode supported fuel cell repeat units each comprises a plurality of graded pores, each having a small end and a large end, that are oriented more or less perpendicular to the thin electrolyte layer, and the graded pores of the first porous electrode scaffold and the graded pores of the second porous electrode scaffold of each of the two or more symmetrical, bi-electrode supported fuel cell repeat units are oriented such that the small end of each graded pore is adjacent the thin electrolyte layer of each of the two or more symmetrical, bi-electrode supported fuel cell repeat units and the large end of each graded pore is distal from the thin electrolyte layer. Said graded pores of the first porous electrode scaffold and the graded pores of the second porous electrode scaffold of each of the two or more symmetrical, bi-electrode supported fuel cell repeat units have characteristic small pore dimensions in the range of about 0.5 um to about 15 um, and has a preferred range of about 2 um to about 10 um, and the characteristic large pore dimensions in the range of about 25 um to about 125 um, and has a preferred range of about 50 um to about 100 um. The thin coating of electrically conductive ceramic deposited upon each of the opposing major outer surfaces of the first and second electrode scaffolds of each of the two or more symmetrical, bi-electrode supported fuel cell repeat units is made of doped-LaCrO$_3$. The first set of nonconductive edge sealants disposed upon each of two opposing edges of the first electrode scaffolds of each symmetrical, bi-electrode supported fuel cell repeat unit, and the second set of nonconductive edge sealants disposed upon each of two opposing edges of the second electrode scaffolds of each symmetrical, bi-electrode supported fuel cell repeat unit are made of a material selected from the group consisting essentially of ceramic and glass. The first porous electrode scaffolds of each of the two or more symmetrical, bi-electrode supported fuel cell repeat units and each of the second porous electrode scaffolds of each of the two or more symmetrical, bi-electrode supported fuel cell repeat units each has a thickness in the range of about 100 um to about 1500 um, and they have a preferred thickness in the range about 300 um to about 750 um. The thin electrolyte of each of the two or more symmetrical, bi-electrode supported fuel cell repeat units has a thickness in the range of about 2 um to about 200 um, with a preferred thickness in the range of about 5 um to about 25 um. The thin coating of electrically conductive ceramic deposited upon each of the opposing major outer surfaces of the first and second electrode scaffolds of each of the two or more symmetrical, bi-electrode supported fuel cell repeat units has a thickness in the range of about 2 um to about 200 um, with a preferred thickness in the range of about 5 um to about 25 um. The first electrode scaffold and the second electrode scaffold and the thin electrolyte layer of each of the two or more symmetrical, bi-electrode supported fuel cell repeat units are made essentially of a single solid oxide ceramic material, and it is an ionic conductor of ionic oxygen and has a fluorite like crystal structure and is selected from the group of materials consisting essentially of doped oxides of zirconium, cerium, bismuth, hafnium, thorium, indium, and uranium, and further, ionic conductors selected from the group of materials consisting essentially of yttria stabilized zirconia, partially stabilized zirconia, scandia stabilized zirconia, gadolinium doped ceria samarium doped ceria and yttrium doped ceria, and a perovskite oxide conductor, strontium and magnesium-doped lanthanum gallate or LaSrGaMgO$_3$. The ionic conductor might also be selected from the group of materials consisting essentially of conductors of protons. The two or more symmetrical, bi-electrode supported fuel cell repeat units, the first electrode scaffold, the second electrode scaffold, the thin electrolyte layer, the thin coating of electrically conductive ceramic deposited upon the opposing major outer surfaces of the first and second electrode scaffolds, the first set of edge sealants disposed upon each of two opposing edges of the first electrode scaffolds of each symmetrical, bi-electrode supported fuel cell repeat unit, and the second set of edge 5 sealants disposed upon each of two opposing edges of the second electrode scaffolds of each symmetrical, bi-electrode supported fuel cell repeat unit all have essentially the same coefficient of thermal expansion, and upon completion of assembling of all the aforementioned parts they are sintered into a single monolithic ceramic fuel cell framework. Each first electrode scaffold of each of the two or more symmetrical, bi-electrode supported fuel cell repeat units within the sintered monolithic ceramic framework has catalytically active anodic electrode properties, and each second electrode scaffold of each of the two or more symmetrical, bi-electrode supported fuel cell repeat units within the sintered monolithic ceramic framework has catalytically active cathodic electrode properties.

The invention is also a method of making a monolithic solid oxide fuel cell stack of two or more symmetrical bi-electrode supported solid oxide fuel cell repeat units, comprising the steps of freeze casting a ceramic slurry to create a graded pore tape having a plurality of graded pores, each of said pores having a first end with a small pore opening and a second end with a large pore opening, immediately followed by freeze drying the graded pore tape and then cutting the freeze dried graded pore tape into one pair of equal size first and second tape pieces for each of the two or more fuel cell repeat unit in the fuel cell stack, and coating each surface having small pore openings of each first and second graded pore tape piece of each pair with a thin layer of non-porous ceramic ink. The coated surfaces of each first and second graded pore tape piece are mated to form two or more layered structures, the surfaces of which having the large pore openings are coated with a thin aqueous layer of electrically conductive ceramic ink prior to mating the coated two or more layered structures into a single metastructure upon which a ceramic sealant over each of two opposing edges of each first piece of graded pore tape in each of the two or more layered structures in the metastructure and placing a ceramic sealant over each of two opposing edges of each second piece of graded pore tape in each of the two or more layered structures in the metastructure to form a green fuel cell framework which is then sintered into a monolithic structure that, subsequent to cooling can be subjected to solution and thermal treatment means to impart anodic electrode catalytic activity to each of the first pieces of graded pore tape in each of the two or more layers structures while solution and thermal treatment means are used to impart cathodic electrode catalytic activity to each of the second pieces of graded pore tape in each of the two or more layered structures.

The invention is yet also a sintered monolithic ceramic solid oxide fuel cell stack that is optimized for electrolysis of such materials as carbon dioxide and water, the fuel cell stack comprising two or more symmetrical, bi-electrode supported fuel cell repeat units each repeat unit including a graded pore anode, a graded pore cathode and a thin electrolyte layer disposed between the graded pore anode and cathode; a thin layer of electrically conductive ceramic disposed between each fuel cell repeat unit, a first set of nonconductive edge sealants disposed upon each of two opposing edges of the graded pore anode of each symmetrical, bi-electrode supported fuel cell repeat unit, and a second set of nonconductive edge sealants disposed upon each of two opposing edges of the graded pore cathode of each symmetrical, bi-electrode supported fuel cell repeat unit.

BRIEF DESCRIPTION OF THE FIGURES

The structure, operation, and advantages of the present invention will become apparent upon consideration of the description herein below taken in conjunction with the accompanying FIGURES. The FIGURES are intended to be illustrative, not limiting. Certain elements in some of the FIGURES may be omitted, or illustrated not-to-scale, for illustrative clarity. The cross-sectional views may be in the form of "slices," or "near-sighted" cross-sectional views, omitting certain background lines that would otherwise be visible in a "true" cross-sectional view, for illustrative clarity.

Although the invention is generally described in the context of these preferred embodiments, it should be understood that the FIGURES are not intended to limit the spirit and scope of the invention to these particular embodiments.

Certain elements in selected ones of the FIGURES may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the FIGURES can be numbered such that similar (including identical) elements may be referred to with similar numbers in a single FIGURE. For example, each of a plurality of elements collectively referred to as 199 may be referred to individually as 199a, 199b, 199c, etc. Or, related but modified elements may have the same number but are distinguished by primes. For example, 109, 109', and 109' are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

Figure 1:
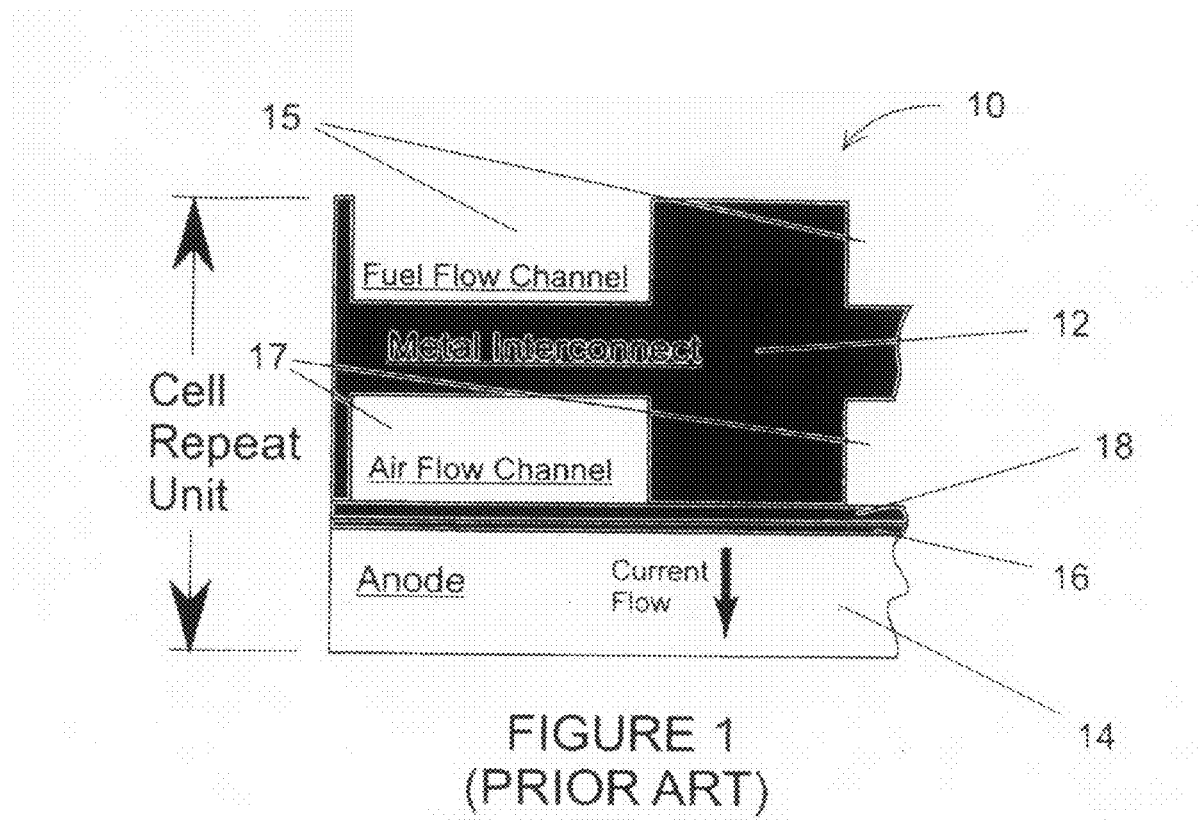
Figure 2:
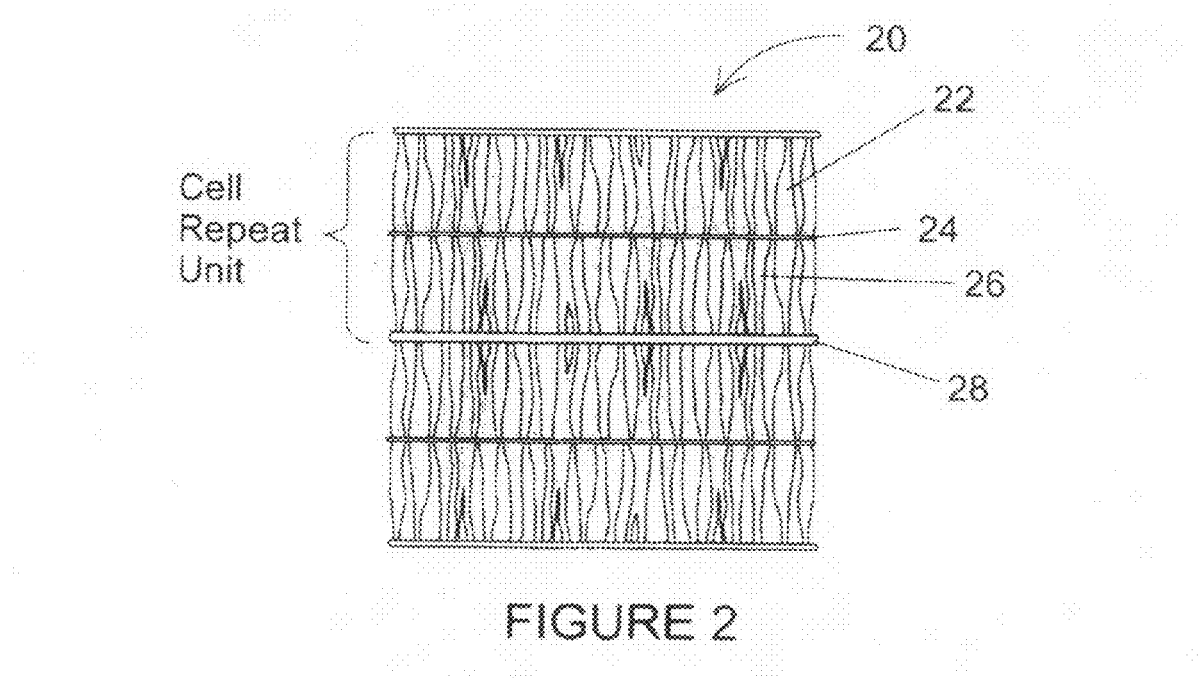
Figure 3:
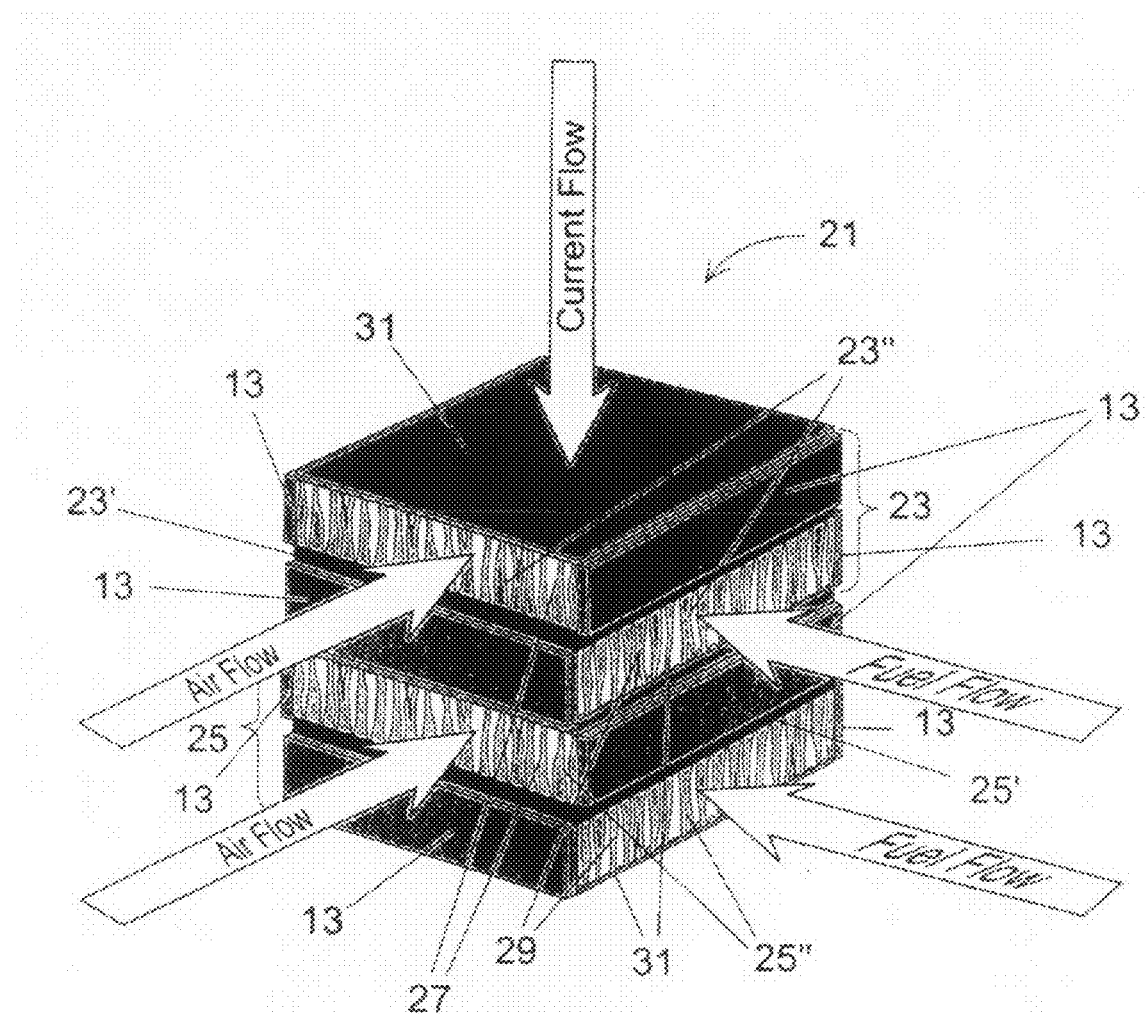

The structure, operation, and advantages of the present preferred embodiment of the invention will become further apparent upon consideration of the following description taken in conjunction with the accompanying FIGURES, wherein:

FIG. 1 is an orthogonal schematic side view of a prior art anode supported cell 'repeat unit' with metal interconnects;

FIG. 2 is an orthogonal schematic side view of a fuel cell repeat unit, according to the present invention;

FIG. 3 is an oblique schematic view of a monolithic two-cell solid oxide fuel cell according to the present invention.

Figure 4A:
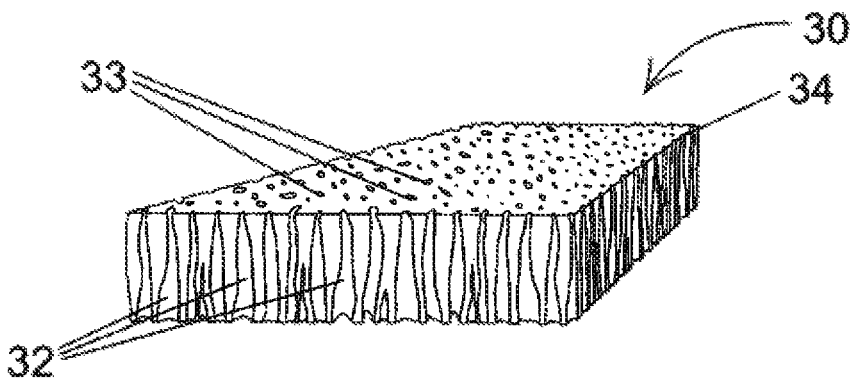
Figure 4B:
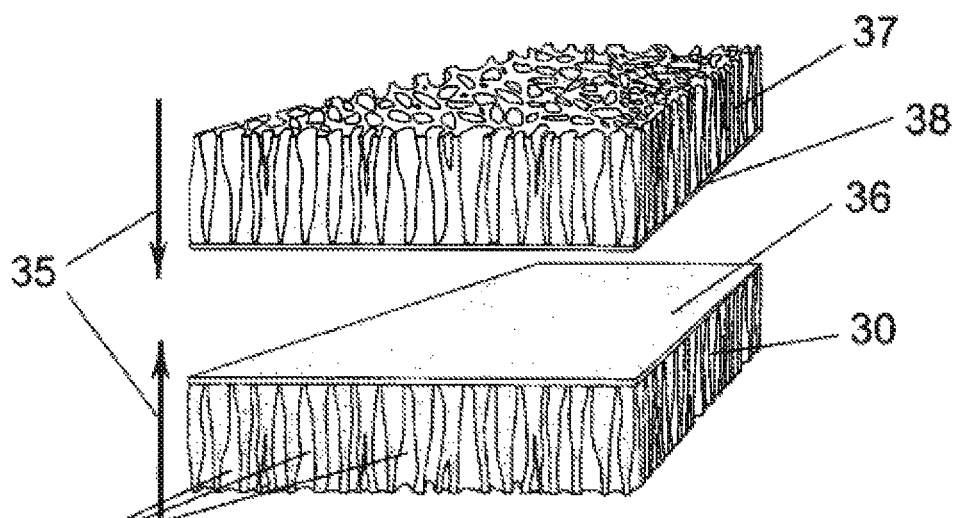
Figure 4C:
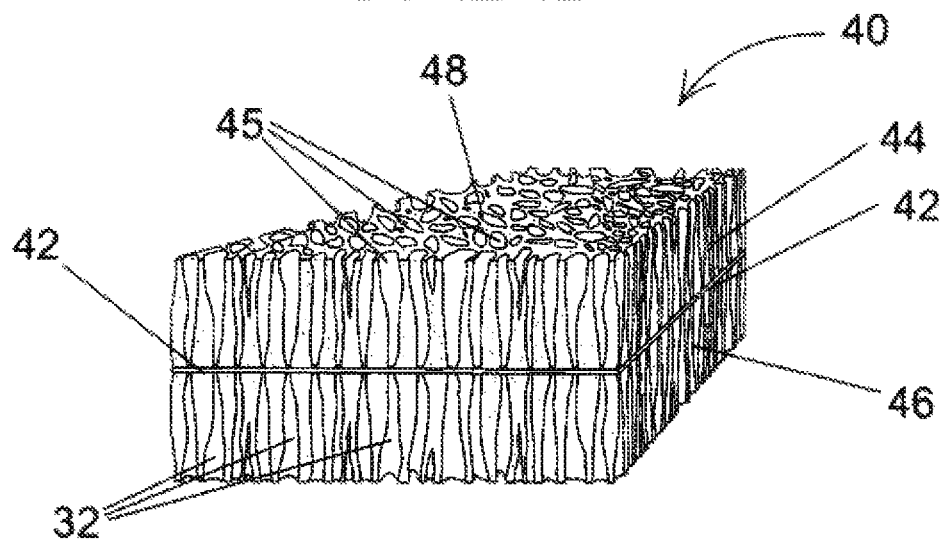
Figure 5A:
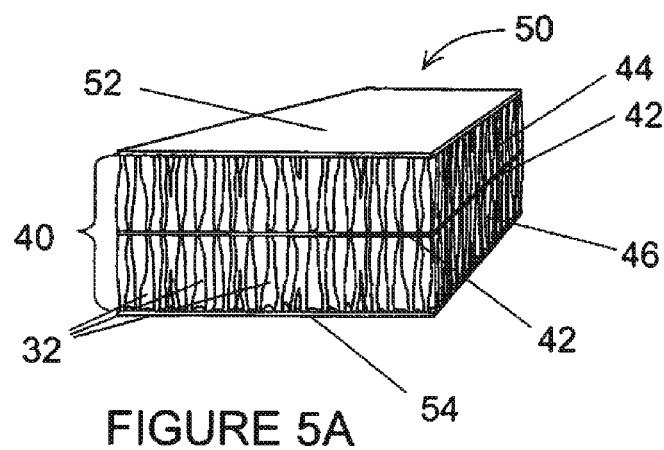
Figure 5B:
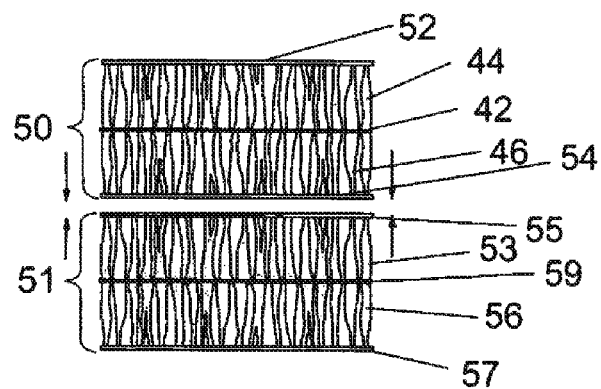
Figure 5C:
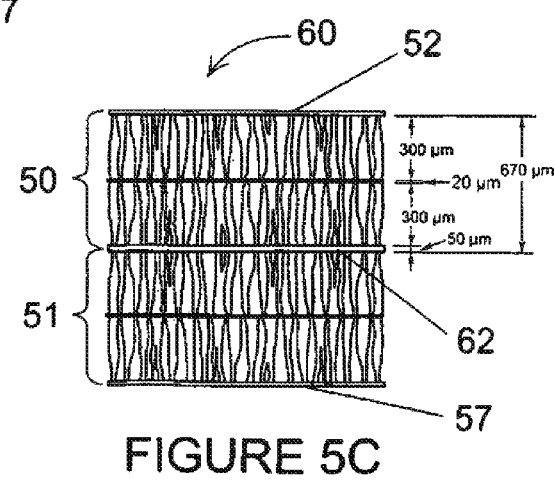
Figure 6:
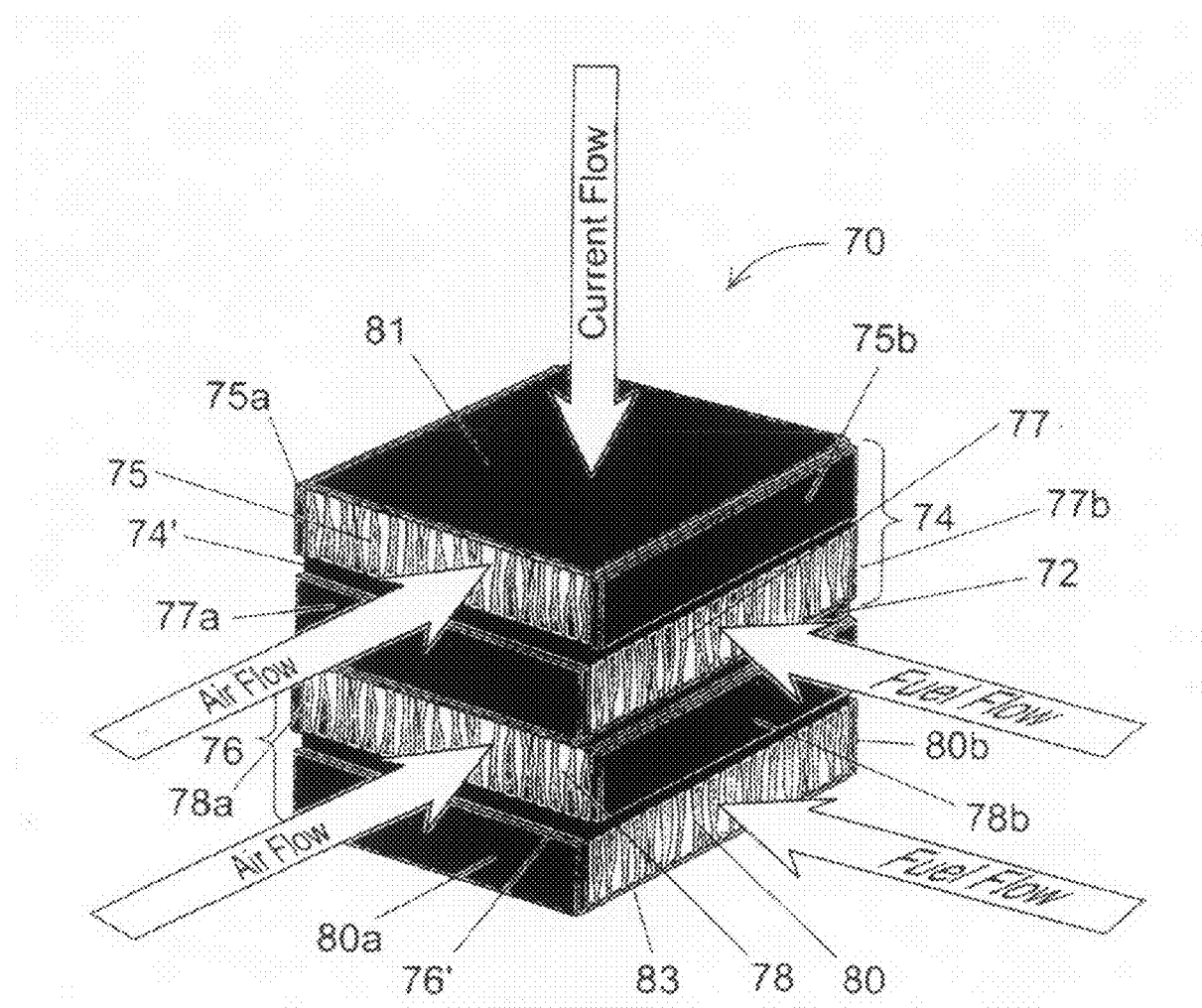

FIG. 4A is an oblique schematic view of a piece of 'green' YSZ tape according to the present invention;

FIG. 4B is an oblique schematic view of two pieces of 'green' YSZ tape, with YSZ electrolyte layers, being brought together;

FIG. 4C is an oblique schematic view of two pieces of 'green' YSZ tape combined into a single complete cell; this view could also be that of a complete sintered cell;

FIG. 5A is an oblique schematic view of two pieces of 'green' YSZ tape combined into a single complete cell with the interconnect layers printed on each side;

FIG. 5B is an orthogonal schematic edge view of two cells, with printed on interconnects, being brought together, FIG. 5C is an orthogonal schematic edge view of two cells, with printed on interconnects, in a unitized form prior to sintering; and FIG. 6 is an oblique schematic view of a monolithic two-cell solid oxide fuel cell according to the present invention.

DEFINITIONS

"Aqueous" refers to the liquid component, such as water or organic solvent, of a slurry material.

"Fuel cell" refers to a device comprising an electrolyte that is disposed between two electrodes, one of which reacts with a fuel, the other with an oxidizer.

"Fuel cell stack" refers to a stack of individual fuel cells that are electrically connected to one another in parallel or series to provide electric power at, respectively, low voltage or high voltage.

"Monolith" or "monolithic" refers herein to a unitary ceramic object comprised of sintered solid oxide material.

"Scaffold" a graded pore YSZ tape which, subsequent to sintering, is a porous ceramic that can be treated, with appropriate metal solutions and heat, to have imparted to it either anodic or cathodic catalytically active properties.

"Symmetrical" refers to the like thicknesses of the electrodes and the electrode scaffolds that support thin intervening electrolyte layers within each fuel cell repeat unit.

DETAILED DESCRIPTION OF THE PREFERRED EMBODIMENTS

The present invention addresses the difficulties listed hereinabove in the Background section in reference to solid oxide fuel cells based on the anode supported cell (ASC) design. In particular the present invention addresses the problems of differential shrinkage of fuel cell components during high-temperature processing and the weight associated with the massive metal interconnects that are disposed between the individual fuel cells within a fuel cell stack.

The present invention is a novel solid oxide fuel cell (SFC) stack, and method for making same. The stack according to the present invention comprises individual bi-electrode supported fuel cells in which a thin electrolyte layer is supported between porous electrodes of essentially equal thickness. Individual cell repeat units are made from graded pore ceramic 'tape' that has been created by the freeze cast method followed by freeze drying. The plurality of graded pores within each electrode scaffold are introduced by freeze casting of ceramic tape such that each graded pore has a small end and a large end and is oriented more or less perpendicular to major surfaces of the tape and, ultimately, to the thin electrolyte layer. Each piece of graded pore tape later becomes a graded pore electrode scaffold that, subsequent to sintering, is made into either an anode or a cathode by means of appropriate solution and thermal treatment means. Each cell unit is assembled by depositing of a thin coating of ion conducting ceramic material upon the side of each of two pieces of tape surface having the smallest pore openings, and then mating the coated surfaces to create an unsintered electrode scaffold pair sandwiching a thin electrolyte layer. The opposing major outer exposed surfaces of each cell unit is given a thin coating of electrically conductive ceramic, and multiple cell units are stacked, or built up by stacking of individual cell layers, to create an unsintered fuel cell stack. Ceramic or glass edge seals are installed to create flow channels for fuel and air. The cell stack with edge sealants is then sintered into a single monolithic ceramic fuel cell framework. Said solution and thermal treatments means convert the electrode scaffolds into anodes and cathodes. The thin layers of electrically conductive ceramic become the interconnects in the assembled stack.

FIG. 1 is an orthogonal schematic side view of a portion of a prior art single solid oxide fuel cell repeat unit 10. The labeled 'Cell Repeat Unit' 10 is a single fuel cell element comprising, from the top in FIG. 1, a metal interconnect 12, having fuel flow channels 15 (which are adjacent the unshown anode portion of another cell repeat unit), air flow channels 17 adjacent the cathode 18, and electrolyte layer 16.

FIG. 2 is an orthogonal schematic edge view of a fuel cell stack 20 according to the present invention. The comparable fuel cell repeat unit is so labeled, comprising an anode 22 (which can also be referred to in a general way as an 'electrode scaffold' or, more particularly, as an 'anode electrode' or as an 'anode electrode scaffold' or, as explained in detail below, and according to the fabrication process, it could also be a 'cathode electrode' or a 'cathode electrode scaffold'), an electrolyte layer 24, a cathode 26 (which can be referred to in ways comparable to those given parenthetically above in relation to the anode), and an interconnect 28. The thin electrolyte layer 24 has a thickness in the range of about 2 um to about 200 um, with a preferred thickness in the range of about 5 um to about 25 um.

Each bi-electrode supported fuel cell repeat units of the two-cell stack 20 in FIG. 2, and all structural and supporting parts of the fuel cell stack according to the present invention, is, upon completion of the stack fabrication process, a single sintered solid oxide monolith which, subsequent to the high-temperature sintering process that results in a cell stack monolith, is subsequently subjected to solution and thermal treatment means wherein the electrode scaffolds 22,26 acquire their respective anodic and cathodic catalytic properties. Said solution and thermal treatment means are described in more detail hereinbelow but, briefly, entail treatments with aqueous solutions of metal salts and with heat so as to impart to the electrode scaffolds 22,26 the catalytically active properties of anodes and cathodes.

FIG. 3 is an oblique schematic view of a complete monolithic solid oxide fuel cell 21 according to the present invention. FIG. 3 can as well be said to represent a 'green' fuel cell framework 21, i.e., prior to sintering, or a sintered ceramic framework immediately after sintering and before the electrode scaffolds (22,26 in FIG. 2) have been subjected to solution and thermal treatment means, described hereinbelow, to impart to them anodic and cathodic catalytic activities. Shown also in FIG. 3 are repeat cell units 23,25 and their respective thin electrolyte layers 23',25' which are disposed between first and second respective porous electrode scaffolds **23*',25", which could as well be referred to as actual electrodes, depending upon the stage of completion {sintered or not, with or without solution and thermal treatments means applied to the electrode scaffolds) of the assembly 21. Interconnects 31 are shown on the top and bottom of the stack 21, with one being disposed between the individual cells 23,25. The interconnects 31 are made of thin layers of electrically conductive ceramic or of cermet. The interconnects 31 each has a thickness in the range of about 2 um to about 200 um, with a preferred thickness in the range of about 5 um to about 25 um. Nonconductive edge sealants 13, which are made of a nonconductive material selected from the group consisting essentially of ceramic or glass, direct the flow of air and fuel respectively through porous electrode faces 27 and 29. All components shown in FIG. 3** are made of materials having at least the shared property of having essentially the same coefficient of thermal expansion.

Referring again to FIG. 2, it should be noted that the fuel cell stack subassembly 20 is made mostly of a single ceramic material such as yttria stabilized zirconia (YSZ), or other material selected from the class of materials that includes ionic conductors, either protons or oxygen ions and preferably oxygen ions. In the case of a protonic conductors the main material of the subassembly 20 would be made of the general class of materials such as doped barium cerate (BaCe0$_3$) or doped strontium cerate (SrCeO$_3$), doped barium zirconate (BaZr0$_3$) or strontium zirconate (SrZr0$_3$) and mixtures of these, and not limited to these materials, as long as the materials are stable in both the reducing and oxidizing environments that the cell is exposed to. In the case of oxygen ion conductors, many of which have the fluorite crystal structure, the subassembly 20 is made of the general class of materials such as doped zirconia (Zr0$_2$), doped ceria (Ce0$_2$) and other doped oxides of metals such as bismuth, hafnium, thorium, indium or uranium. More specifically, oxide ion conductors of materials such as yttria stabilized zirconia (YSZ or 8YSZ), partially stabilized zirconia such as 3YSZ, scandia stabilized zirconia (ScSZ), gadolinium doped ceria (GDC) or other commonly doped cerias such as samarium or yttrium (SDC or YDC), and a perovskite oxide conductor, strontium and magnesium-doped lanthanum gal late or LSGM (LaSrGaMg0$_3$), and that the interconnect 28 is an electrically conductive ceramic, doped lanthanum chromite (LaCr0$_3$). Doped lanthanum chromite is a perovskite with the AB0$_3$ structure and it can be doped at either the A-site or B-site or both, to improve the sinterability, shrinkage match, thermal expansion match, conductivity, etc. of the interconnect to the remainder of the fuel cell system. Suitable dopants might include Mg, Ca, Sr, Co, Y, Ni, Ti, Cu, Mn, V, Pr, Al, and mixtures of these and are not limited to these. The doped LaCr0$_3$ powder might also be produced either A-site rich or A-site deficient where the A/B site ratio is not=1.0.

Referring now to FIGS. 4A through 4C, selected parts of the fabrication sequence for a single cell are recapitulated from the aforementioned patent application entitled, SYMMETRICAL BI-ELECTRODE SUPPORTED CELL FOR SOLID OXIDE FUEL CELLS, which is incorporated in its entirety herein by reference hereto, so as to explain the complete fabrication process of a solid oxide fuel cell stack according to present invention. FIG. 4A shows in oblique schematic view a rectangular section of 'green tape' 30 (i.e., freeze dried but unsintered) that is characterized by •aligned graded pores 32, the graded porosity of which derives from the tape freeze casting process or method taught in the aforesaid patent application in reference to the creation of a single monolithic fuel cell framework. The graded-pore green tape 30 is flexible by virtue of including a polymer such as methocel if the solvent is water, or, if an organic solvent is used, other polymers, such as polyvinyl butyral (PVB). The tape segment 30 has a thickness (t) of the green tape in the range of 100 um to 1,500 μm and a preferred range of 300 um to 750 um. The characteristic width dimensions of the graded pores 32 is such that the smallest pore openings 33 are on one face 34. The characterizing dimensions of the graded pores 32 are such that the characteristic small pore dimension is between 0.5 um and 15 um, with a preferred range of between 2 um and 10 um, and the characteristic large pore dimensions is between 25 um and 125 um, and most preferably of between 50 um and 100 um. The green tape 30 is made of such materials as yttria stabilized zirconia (YSZ), or the general class of materials comprising ionic conductors, either protonic or oxygen ionic and preferable oxygen ionic. In the case of a protonic conductors the monolith 20 is made of the general class of materials such as doped barium cerate (BaCe0$_3$) or doped strontium cerate (SrCeO$_3$), doped barium zirconate (BaZr0$_3$) or strontium zirconate (SrZr03> and mixtures of these, and not limited to these materials, as long as the materials are stable in both the reducing and oxidizing environments that the cell is exposed to. In the case of oxygen ion conductors, many of which have the fluorite crystal structure, materials such as doped zirconia (Zr0$_2$), doped 1 ceria (Ce0$_2$) and other doped oxides of metals such as bismuth, hafnium, thorium, indium or uranium. More specifically, oxide ion conductors of materials such as yttria stabilized zirconia {YSZ or 8YSZ), partially stabilized zirconia such as 3YSZ, scandia stabilized zirconia (ScSZ), gadolinium doped ceria (GDC) or other commonly doped cerias such as samarium or yttrium (SDC or YDC), and a perovskite oxide conductor, strontium and magnesium-doped lanthanum gallate or LSGM (LaSrGaMg0$_3$) along with the aforementioned admixture of a suitable polymeric material which is burned off during the subsequent high-temperature sintering process that serves to fuse the structural components of the fuel cell stack 21 (FIG. 3) into a single ceramic monolithic fuel cell stack, or stack framework if the electrode scaffolds 23",25" have not yet been subjected to the treatment means that imparts the required anodic and cathodic catalytic activity.

In the remaining portion of this description, YSZ is used to refer generally, generically and specifically to be the material from which the main structural elements, i.e., electrode scaffolds and electrolyte layers, of the fuel cell stack are made.

FIG. 4B shows in oblique schematic view the green tape 30 of FIG. 4A, with its surface 34 (in FIG. 4A) coated with a thin and nonporous layer (~10 um) of YSZ 'ink' 36. Shown in FIG. 4B above the ink coated tape 30 is a second piece of tape 37 that also has a thin and nonporous YSZ ink layer 38, oriented such that the two inked layers 36,38 are facing one another prior to being brought together as indicated by the arrows 35, the result being that the two inked layers, which might or might not have dried completely after being applied erge into a single nonporous YSZ electrolyte layer 42, as shown in FIG. 4C.

FIG. 4C is an oblique schematic view of a single YSZ layered structure, or cell framework, 40 comprising a first electrode scaffold 44 and a second electrode scaffold 46, with the intervening electrolyte layer 42 disposed therebetween. This layered single-cell framework structure 40 can, upon completion of high temperature sintering during which the polymeric components of the YSZ is burned away, become one operative fuel cell part of single monolithic framework for a solid oxide fuel cell as described in the aforementioned patent application, SYMMETRICAL BI-ELECTRODE SUPPORTED CELL FOR SOLID OXIDE FUEL CELLS. Note that the graded porosities 32 of the two electrode scaffolds 44,46 are oriented such that the larger pore openings 45 are visible on the upper surface 48 of the electrode scaffold 44; in other words, the small ends of each of the graded porosities 32 are adjacent the thin electrolyte layer 42, while the large ends 45 (visible on the top surface 48 only in FIG. 4C) are distal from the electrolyte layer.

Fabrication of a Fuel Cell Stack

The cell 40 of FIG. 4C is exemplary of a single fuel cell that when stacked with like cells results in a multi-celled fuel cell stack 20 of the sort shown schematically in FIG. 2. Those skilled in these particular arts will recognize that the sequence of making a stack consisting of a plurality of individual fuel cells could proceed in such a way that individuals cells 40 could be stacked as described below, or the individual layers of graded pore YSZ tape and nonporous electrolyte layers 42 could be individually treated and stacked one upon another prior to sintering. The cell-stacking procedure that is described hereinbelow assumes that individual cells 40 are treated as follows and then stacked one upon another.

FIG. 5A shows an individual cell framework 50 which contains the cell 40 shown in FIG. 4C, but with additional nonporous coatings 52,54, top and bottom, covering the large pore holes 45 shown in FIG. 3C. Said coatings 52,54 are sprayed, printed, or deposited uniformly by other similar means as a liquid slurry upon the large pore surfaces (which are not visible in FIG. 5A), and then allowed to dry. The thin, nonporous layers 52,54 are made of an electrically conductive ceramic, doped lanthanum chromite ($LaCrO_3$), doped to improve the sinterability, shrinkage match, thermal expansion match, conductivity, etc. of the interconnect, to the remainder of the fuel cell system. Suitable dopants might include Mg, Ca, Sr, Co, Y, Ni, Ti, Cu, Mn, V, Pr or others. Doped $LaCrO_3$ has a coefficient of thermal expansion that is sufficiently close to that of the electrode scaffolds 44,46 and the electrolyte layers 42 so that the high temperatures of the sintering and subsequent heating processing, including operation of the completed fuel cell, does not give rise to stresses that might lead to failure during fabrication or unreliability of service of the finished fuel cell stack. The liquid slurry, organic based, form in which the layers 52,54 are deposited, also contain a polymer component such as poly vinyl butyral (PVB), that gets burned off during the sintering of the assembled fuel cell stack.

The polymeric compounds that are included in the various 'green' (i.e., unsintered) layers of YSZ (electrodes scaffold and the electrolyte layers) and doped $LaCrO_3$ interconnect layers, such as 52,54 in FIG. 5A, impart a degree of flexibility to the various cell layers, thereby aiding in the intimate mating of the cell component layers with one another prior to sintering. The layered structure 50 is essentially a green (i.e., unsintered) fuel cell repeat unit.

FIG. 5B is an orthogonal edge schematic view of two cells 50,51 being brought together, cell 50 being the one shown in FIG. 5A, and cell 51 being of the same sort, comprising two layers of doped $LaCrO_3$ 55,57, two electrode scaffolds 53,56, and an electrolyte layer 59.

FIG. 5C as an orthogonal edge view of a two-cell stack or metastructure 60, comprising the cells 50 and 51 of FIG. 5B. That is, the two (or more) layered structures 50,51 are mated into a single metastructure 60. Note that the two layers 54,55 of doped $LaCrO_3$ shown in FIG. 5B are shown as a single doped $LaCrO_3$ interconnect layer 62 in FIG. 5C. In other words, the stacking of the cells 50,51 can be done while the layers 54,55 of FIG. 5B are not fully dried, or, even if they are fully dried, they will become unified into the single contiguous interconnect layer 62 during the final sintering process. Those who are skilled in the art should easily recognize that additional cells can be added to the stack 60 prior to sintering.

There are basically three types of materials in the stack 21 (FIG. 3) that go into the sintering furnace, namely the YSZ components (electrode scaffolds and electrolyte layers), the doped $LaCrO_3$ interconnect layers, and the edge sealants 13 (FIG. 3), all of which have essentially the same thermal expansion coefficients and can be tailored so as to be sintered at the same time, rate, and temperature. The inventors feel that a fuel cell stack of up to at least five cells is feasible.

Prior to final sintering, the dense and non-porous edge seals 13 (FIG. 3) must be put in place so as to direct the cross flow of air and fuel as shown also in FIG. 6, which is an oblique schematic view of a two-cell stack 70 having a single interconnect 72 between the two cells 74,76. The cells 74,76, including electrolyte layers 74',76' respectively, have attached to them opposing sets of edge seals 75a,75b, 77a, 77b, 78a,78b,80a,80b which are applied as an aqueous paste of YSZ or other materials listed elsewhere hereinabove having coefficients of thermal expansion essentially the same as that of the other components of the monolithic solid oxide fuel cell stack 70. The edge seals 75a,75b and 78a,78b serve the function of creating flow channels for air moving into and through the two respective porous cathode electrodes faces 75,78, and the seals 77a,77b and 80a,80b create flow channels for fuel through the two anode electrode faces 77 and 80.

As should be apparent to those skilled in the art, FIG. 6 is a two-cell exemplary representation of a multi-cell fuel cell stack. The doped $LaCrO_3$ interconnects 81 and 83 at the top and bottom of the stack 70 communicate electrical current flow to and from external electrical loads. The edge seals 75a,75b,77a,77b,78a,78b,80a,80b might, under certain conditions, be made of a glass ceramic rather than from YSZ, and they may contain a polymeric compound when the sealant material is applied to the stack 70 prior to sintering.

After a multi-cell stack 70 of FIG. 6 is assembled, including its edge seals, it is allowed to dry thoroughly and then put into a sintering furnace for sufficient time of 10 minutes to 10 hours, preferably 1-2 hours, and at sufficient temperature of typically 1400 to 1700° C., ideally 1350-1400° C. to cause the solid oxide particles of YSZ and $LaCrO_3$ to partially fuse. Because the cells and cell stack, in the green unsintered state, are all ceramic, except for the polymer components, sintering temperatures can be optimized for densification of the electrolyte, scaffold and interconnect layers without concerns of reactions of YSZ with the electrode materials, which are added later. The sintered result is a single monolithic fuel cell stack framework that, upon treatment subsequent to sintering, converts the porous electrode scaffolds into the necessary anode and cathode electrodes, the result being an operational fuel cell stack that, when fed fuel and air, can produce an electric current.

In the final steps of fabrication, subsequent to sintering, the electrode scaffolds are subjected to solution and thermal treatment means wherein a suitable solution of metal salts is pulled by capillary action into one set of electrode scaffolds and a different solution of metal salts is pulled by capillary action into the other set of electrode scaffolds. Subsequent heating of the solution treated scaffolds converts the metal salts into catalytically active forms that impart anodic properties to one set of electrode scaffolds and cathodic properties to the other set of scaffolds. The means also includes that the cathodic scaffolds of the stack must be masked off so that only the porous fuel channels in the electrode scaffolds can be exposed and active anode materials, such as Ni metal [Co, Cu, Fe, Pt, Pd], are infiltrated, as salt, nitrate, carbonate, chloride or other solutions, into the porous anode region; the nickel compound later becomes an active metallic, electrocatalyst. The anode channels are then masked and the air channels are infiltrated with active cathode materials, such as lanthanum manganite ($LaMnO_3$), which is a p-type perovskite that typically is doped with rare earth elements (e.g., Sr, Ce, Pr, Ca, Co, Fe, Cu, Ga, etc. but not limited to these) to enhance its conductivity. Most often it is doped with strontium and referred to as LSM ($La_{1-x}Sr_xMnO_3$). Other potential cathode materials include indium oxide, commonly doped with oxides of Sn, Pr or Zr.

The inventors have tested liquid infiltration into the electrode scaffolds and have found that the solutions travel over distances of centimeters very quickly, even without a vacuum, due to the strong capillary action of the graded pores of the electrolyte scaffolds.

By using the YSZ electrode scaffolds as turbulent diffusion channels for fuel and air, with a thin interconnect on the order of 50 microns, the power density (kw/kg) and simplicity of the BSC stack is increased.

In summary, the BSC fuel cell stack according to the present invention provides a number of advantages when compared to other planar SOFC designs. The freeze-tape casting technology, which allows for graded porosity to be incorporated into the green tape in a single step, greatly simplifies the fabrication of the BSC cells and adds processing flexibility which can be used to optimize the BSC cells and stacks for optimum performance. Some of the advantages of the BSC stack design are: 1) the thin electrolyte and porous support are all made of a single material, such as YSZ, making fabrication and sintering less challenging; 2) the porous YSZ electrode scaffolds of each cell protect each thin electrolyte layer from the stresses created by the conventional Ni metal anode which has a higher coefficient of thermal expansion; 3) the porous YSZ supports can be infiltrated at the outer edges, with YSZ or other ceramic or glass materials with matched CTE, to provide for hermetic seals that are fully dense upon completion of sintering; 4) each ceramic interconnect is supported so that a thin, dense layer of doped $LaCrO_3$ can be used, thereby reducing the electrical resistance of the non-metallic interconnect; 5) gas channels are provided by the graded porosity in the YSZ support, which allows the ceramic interconnect to be flat, without channels or grooves, making fabrication and sintering less complex which essentially decreases the cost/weight while increasing the power density; 6) both interfaces at the electrolyte/electrode support and interconnect/electrode support are rough with a large amount of surface area to provide intimate contact with the active electrode materials which reduces interfacial resistance; 7) filling the porous support structures with active electrode materials, after sintering, provides intimate electrical contact between the cell and the interconnect, a major problem of other designs, reducing the internal stack resistance; 8) an anode with graded porosity will be less susceptible to diffusion limitations and should achieve high fuel utilization which is a problem with traditional anode supported cells with a uniform pore structures; 9) a wider selection of cathode and anode materials, some with CTEs higher than YSZ, can be used since the materials will not be exposed to the high temperature of the first sintering step of the stacked YSZ electrode scaffolds, electrolyte and interconnects; 10) because of the symmetrical cell design which reduces stresses, alternative electrolyte materials with higher ionic conductivity, such as $LaSrGaMgO_3$ can be used; 11) the stack can be operated at higher temperatures since it uses more traditional ceramic interconnect materials, with proven long life and stability, rather than metal interconnects; and 12) the YSZ support structure in the cell makes both the electrodes and the seals more tolerant of thermal cycles and oxidation-reduction cycles.

By using thin ceramic interconnects as the separator plates for hydrogen and fuel, in conjunction with the porous YSZ scaffolds for gas diffusion, the BSC stack essentially removes the weight and volume of the thick metal interconnect used in stacks of anode-supported cells. Estimates for the power density of an ASC stack, producing 0.4 $W/cm^2$ of active electrode area, are on the order of 1.3 kW/L and 0.28 kW/kg. By comparison, taking into account only the active cell area, a BSC stack generating the same 0.4 $W/cm^2$ would have a power density of 6.0 kW/L and 1.37 kW/kg.

A Second Embodiment

The inventors envision a second embodiment of their solid oxide fuel cell stack invention wherein the invention is modified as described below for the purpose of providing crew life support for NASA exploration missions including surface habitat and EVA suit implementation. More specifically, the present invention can be modified and optimized to perform electrolysis on the $CO_2$ so as to produce breathable oxygen in $CO_2$ rich settings such as the surface of Mars.

Modification and optimization of the present invention would include the use of electrocatalysts tailored for electrolysis of $CO_2$. The advantages would include low weight, durability, and high efficiency and specific power density.

The atmosphere on Mars is 95% $CO_2$, making it an obvious source of $O_2$. A single solid oxide fuel cell has successfully demonstrated the production of $O_2$ from the electrolysis of $CO_2$. The products of the electrolysis are pure $O_2$ and CO and the power required to produce the $O_2$ would come from solar power. Also, said fuel cell would also be reversible and able to generate power from the stored CO and $O_2$ are used as fuel.

Heretofore, only fuel cells having very thick YSZ electrolytes, on the order of 300 to 600 microns thick, have been demonstrated (see AIAA 2000-1068 "Update on the Oxygen Generator System for the 2001 Mars Surveyor Mission," Sridhar, et. al). The thick electrolytes result in very high cell resistance to ionic flow and therefore are characterized by a low rate of oxygen production. Such prior art cells also use Pt or Ag electrodes that are not ideal for this application and add significant cost to development and manufacture. Additionally, and as pointed out hereinabove in relation to prior art solid oxide fuel cells, the previous fuel cell stack designs use heavy metallic interconnect plates between the cells, which significantly increase the stack volume and weight. Said metal interconnects are prone to corrosion and have historically been very difficult to seal against the YSZ ceramic cell.

This is of considerable importance for $O_2$ separation where nearly hermetic seals, capable of withstanding frequent thermal cycles, are required.

Adaptation of the fuel cell or fuel cell stack according to the present invention would require that the electrode scaffolds would be infiltrated with suitable materials, by solution and thermal treatment means similar to those described hereinabove, to provide catalytically active $CO_2$ and $O_2$ electrodes. A specific improvement for this embodiment would be electrode compositions that are more active for $CO_2$ reduction or CO oxidation. Initial studies found that Pt electrodes encountered some degradation due to strong CO adsorption during operation in fuel cell mode. A more active electrode for the $CO/CO_2$ side of the cell would be Cu or CuCe-based, materials since copper is a good oxidation catalyst. A more active electrode for the $O_2$ side of the cell would be mixed conductive perovskite materials, including doped $LaFeO_3$, doped $LaCoO_3$ and doped $LaNiO_3$ or mixtures of these materials.

While the main interest for electrolysis of CO2 to produce $O_2$ comes from NASA for a manned mission to Mars, in a broader sense, reversible fuel cells have many applications for other space missions, such as lunar bases and space stations, where they provide both $O_2$ and power. SOFC technology can be used in all these applications, regardless of whether the requirement is for $CO_2$ electrolysis or $H_2O$ electrolysis. The BSC according to the present invention offers advantages in each case, since it provides for a very thin electrolyte which is balanced on both sides, making it easier to manufacture and more durable. It also allows for more freedom to choose a wider composition of electrodes, making it easier to optimize the electrodes to fit the application. All of these same benefits are applicable to commercial SOFC markets, regardless of whether they are for aerospace, automotive or stationary applications.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A method for making a fuel cell comprising:
producing a solid oxide, non-electrically conductive, unitary ceramic monolith framework including:
a first porous electrode scaffold having a plurality of graded pores and no active anode material;
a second porous electrode scaffold having a plurality of graded pores and no active cathode material; and
a thin electrolyte layer disposed between the first and the second electrode scaffolds;
sintering the solid oxide, non-electrically conductive, unitary ceramic monolithic framework together having no active anode or cathode material therein;
subsequently impregnating the plurality of graded pores of the first porous electrode scaffold with an electrically conductive active anode material; and
subsequently impregnating the plurality of graded pores of the second porous electrode scaffold with an electrically conductive active cathode material.

2. The method of claim 1 further comprising: depositing a thin electrically conductive ceramic coating onto the two outermost exposed surfaces of each of the first and second porous electrode scaffolds.

3. The method of claim 2 further comprising: requiring thin electrically conductive electrical coating deposited on the outer surface of each of the first and second porous electrode scaffolds to have essentially the same coefficient of thermal expansion as the first and second porous electrode scaffolds and the thin electrolyte layer.

4. The method of claim 2 further comprising: using doped $LaCrO_3$ as the material for the thin electrically conductive coating deposited on the outer surface of each of the first and second porous electrode scaffolds.

5. The method of claim 2 further comprising: requiring the thin electrically conductive coating deposited on the outer surface of each of the first and second porous electrode scaffolds to have a thickness in the range of about 2 um to about 200 um.

6. The method of claim 5 further comprising: requiring the thin electrically conductive coating deposited on the outer surface of each of the first and second porous electrode scaffolds to have a preferred thickness in the range of about 5 um to about 25 um.

7. The method of claim 2 further comprising: placing a ceramic sealant over two opposing edges of the first porous electrode scaffold and two opposing edges of the second porous electrode scaffold.

8. The method of claim 7 further comprising: requiring each ceramic sealant to have essentially the same coefficient of thermal expansion as the first and second porous electrode scaffolds, the thin electrolyte layer, and the thin electrically conductive ceramic coatings.

9. The method of claim 1 further comprising: requiring the first porous electrode scaffold and the second porous electrode scaffold each to have a thickness in the range of about 100 um to about 1,500 um.

10. The method of claim 9 further comprising: requiring the first porous electrode scaffold and the second porous electrode scaffold each to have a preferred thickness in the range about 300 um to about 750 um.

11. The method of claim 1 further comprising: wherein the solid oxide monolith framework is comprised of essentially one material, that one material being an ionic conductor.

12. The method of claim 11 further comprising: requiring that the ionic conductor of oxygen ions is selected from the group of materials consisting essentially of doped oxides of zirconium, cerium, bismuth, hafnium, thorium, indium, and uranium, and further, ionic conductors selected from the group of materials consisting essentially of yttria stabilized zirconia, partially stabilized zirconia, scandia stabilized zirconia, gadolinium doped ceria samarium doped ceria and yttrium doped ceria, and a perovskite oxide conductor, strontium and magnesium-doped lanthanum gallate or $LasrGaMgO_3$.

13. The method of claim 1 further comprising: requiring that the first porous electrode scaffold and the second porous electrode scaffold each comprises a plurality of graded pores, each having a small end and a large end, that are oriented more or less perpendicular to the thin electrolyte layer; the small end having a small diametrical pore dimensions; and the large end having a large diametrical pore dimensions.

14. The method of claim 13 further comprising: providing that the graded pores of the first porous electrode scaffold and the second porous electrode scaffold have characteristic small diametrical pore dimensions in the range of about 0.5 um to about 15 um.

15. The method of claim 13 further comprising: providing that the graded pores of the first porous electrode scaffold and the second porous electrode scaffold have preferred characteristic small diametrical pore dimensions in the range of about 2 um to about 10 um.

16. The method of claim 13 further comprising: providing that the graded pores of the first porous electrode scaffold and the second porous electrode scaffold have characteristic large diametrical pore dimensions in the range of about 25 um to about 125 um.

17. The method of claim 13 further comprising: providing that the graded pores of the first porous electrode scaffold and the second porous electrode scaffold have preferred characteristic large diametrical pore dimensions in the range of about 50 um to about 100 um.

18. The method of claim 13 further comprising: providing that the graded pores of the first porous electrode scaffold and the second electrode are oriented such that the small ends of the pores are adjacent the thin electrolyte layer and the large ends are distal from the thin electrolyte layer.

19. The method of claim 1 further comprising: providing that the thin electrolyte layer has a thickness in the range of about 2 um to about 200 um.

20. The method of claim 19 further comprising: providing that the thin electrolyte layer has a preferred thickness in the range of about 5 um to about 25 um.

21. The method of claim 1 further comprising: providing that the active anode material within the first porous electrode scaffold and the active cathode material within the second porous electrode scaffold is selected from the group of materials consisting of metals and metal oxides.

* * * * *